United States Patent Office 3,359,724
Patented Dec. 26, 1967

3,359,724
COOLING MEANS IN COMBUSTORS FOR GAS TURBINE ENGINES
Stephen Downing Barnwell and John Francis Palmer, Bristol, England, assignors to Bristol Siddeley Engines Limited, Filton, Bristol, England, a British company
Filed Mar. 9, 1966, Ser. No. 532,993
Claims priority, application Great Britain, Aug. 3, 1965, 33,073/65
3 Claims. (Cl. 60—39.65)

ABSTRACT OF THE DISCLOSURE

The disclosure of this invention pertains to a gas turbine combustion chamber into which cooling air is passed through a space formed between overlapping wall parts of the combustion chamber, the space including a sudden enlargement of the flow area to reduce the velocity of flow of the cooling air

---

This invention relates to boundary wall structures for hot fluid streams.

It is known to cool a wall dividing a hot fluid flow from a cold fluid flow of higher pressure by providing at the wall a passage admitting some of the cold fluid for the latter to form a film separating the wall from the hot fluid.

It has been found that for good cooling efficiency the velocity of the film must be related to the nature of the hot flow. Also the film should be free from undue turbulence. It can be the case that the pressure difference between the hot and the cold flow is too high for the establishment of a satisfactory film. The main object of this invention is to overcome or reduce this difficulty.

According to this invention a passage system for cooling a wall dividing a hot fluid flow from a cooler fluid flow of higher pressure comprises:

(a) a chamber formed at said wall;
(b) an inlet opening connecting the cold flow side of the wall to the chamber;
(c) an outlet opening connecting the chamber to the hot flow side of the wall;
(d) the interior of the chamber defining a flow passage extending between said openings and shaped to direct flow from the high pressure side of the wall through the outlet opening so as to form a film between the wall and the hot flow adjacent thereto;
(e) the flow passage including a substantially sudden enlargement of the flow area to create turbulence in the flow and thereby to reduce the mean velocity of the flow without a significant rise in static pressure;
(f) the flow passage including, downstream of said sudden enlargement, a portion of substantially uniform flow area to assist in settling said turbulence and in forming a uniform flow;
(g) the outlet opening being dimensioned for the effective flow area thereof to be not less than the effective flow area of the inlet opening; and
(h) the inlet opening lying in a plane at least partially facing the direction of the cold flow.

A construction example of this invention will now be described with reference to the accompanying drawing wherein.

Figure 1:
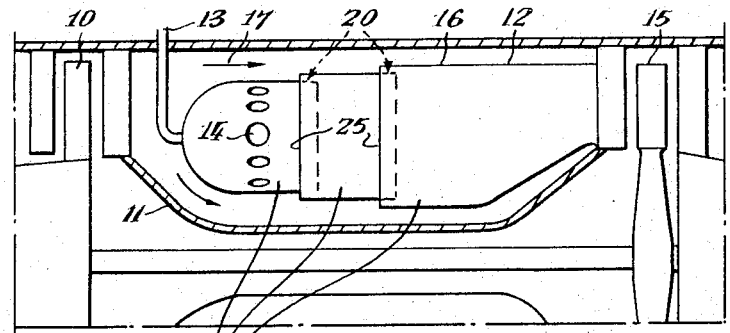
FIG. 1 is an elevation of a gas turbine jet engine shown partly in section and including a combustion chamber.

Referring to the drawing the engine (FIG. 1) comprises a compressor 10 supplying air under pressure to the interior of an air casing 11 which surrounds a series of can-type combustion chambers 12 of which only one is shown. Fuel supplied to the chamber 12 through a supply pipe 13 reacts with air entering the chamber 12 through the holes 14 to produce a flow of burning gases which is exhausted through a turbine 15 which drives the compressor 10. The temperature and pressure conditions at the wall, denoted 16, of the combustion chamber 12 are such that at the outside of the wall 16 there exists a flow 17 of air which is substantially cooler and has a substantially higher total pressure than the flow 18 (FIG. 2) of the burning gases at the inside of the wall 16. Some of the air at the outside of the wall 16 is allowed to enter the chamber 12 through a passage system 20 in such a way that a layer or film 19 of this relatively cool air is formed at the inside of the wall 16 to protect it from the heat of combustion. The film is only effective for a limited distance downstream of the passage system 20 because it tends to dissipate. Therefore it is usually necessary to provide two or more passage systems 20 so that the film 19 is renewed at intervals along the length of the chamber 12. The efficiency of the cooling can be measured in terms of the distance, downstream of any one passage system 20, over which the film is effective in preventing a rise of the wall temperature above a predetermined value.

Figure 2:
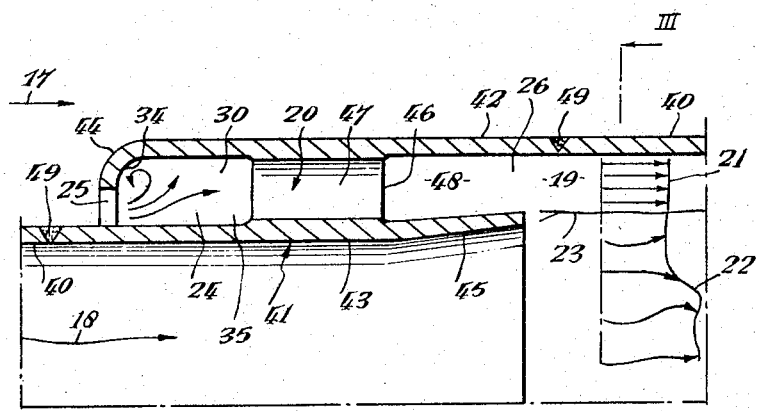
FIG. 2 is an enlarged detail of the said combustion chamber.

In has been found that for good cooling efficiency the film 19 should have a uniform flow, i.e. it should be free from undue turbulence and there should be no undue velocity gradients in the cross section of the flow. Further, it has been found that cooling efficiency can be improved by adjusting the velocity of the film in relation to the velocity of the combustion gases, and as a general rule the velocity of the film should be approximately the same as that of the mean velocity of the directly adjacent part of the flow of the combustion gases so that mixing between the two flows 18, 19 is minimized. The term "mean velocity" is applied to the combustion gases because of the turbulence of these gases. FIG. 2 shows purely diagrammatically a desired velocity profile 21 for the film 19, an indication at 22 of the velocity profile of the hot flow 18, and at 23 the junction of the flows 18, 19 across which mixing should be minimized. It is one of the objects of this invention to provide means for bringing about these desirable conditions. In this connection one must have regard to the pressure drop across the wall 16, i.e. the pressure difference between the flows 17, 18. This pressure drop has to be high enough to force combustion air through the holes 14 in such a way that the air penetrates deeply into the chamber 12. It has been found that such a drop is usually too high for establishing a cooling film of good uniformity of flow and of a velocity sufficiently low to match the velocity of the adjacent hot flow. The difficulty is overcome or reduced by the construction described next below.

Figure 3:
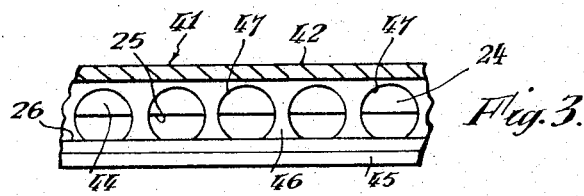
FIG. 3 is a section on the line III—III in FIG. 2.

The passage system 20 comprises a chamber 24 (FIGS. 2, 3) situated at the wall 16 and having an inlet opening 25 from the cold flow 17 and an outlet opening 26 to the interior of the wall 16. Between its inlet and outlet openings 25, 26 the interior of the chamber 24 defines a passage 30 and air flow is established through the passage 30 on account of the pressure drop across the wall 16.

Immediately downstream of the inlet opening 25 the passage has a sudden enlargement 34 of the flow area which has the effect of creating turbulence and thereby reducing the mean velocity of the flow without a rise in static pressure. Downstream of the enlargement 34 the passage 30 has a portion 35 of substantially uniform flow area whereby the tubulence created at the enlargement 34 has the opportunity to settle and the flow approaches the outlet opening 26 in substantially uniform manner.

The wall 16 comprises sections 40 of increasing diameters to make up what is known as a "stepped" wall.

FIG. 2 shows that the juncture of two such sections 40 is constituted by an annulus 41 comprising an outer wall 42 and an inner wall 43, the walls 42, 43 forming between them the chamber 24 whose interior defines the flow passage 30. The inlet opening 25 occurs between the wall 43 and a curved edge portion 44 of the wall 42. The sudden enlargement 34 of the flow area lies at the inside of the edge portion 44. At the portion 35 of uniform flow area the walls 42, 43 are parallel. The oulet opening 26 lies between the wall 42 and the downstream extremity of the wall 43. A reduction in flow area from the portion 35 to the outlet opening is brought about by making the downstream edge portion, denoted 45, of the wall 43 convergent towards the wall 42. The opening 26 must of course have a flow area which is not less than the flow area of the opening 25 in order to obtain a reduction of flow velocity through the passage system 20.

The walls 42, 43 are united by a web 46 provided with holes 47 leading to a chamber 48 which ends in the outlet opening 26. Since the flow area of the holes 47 is necessarily less than the flow area of the portion 35 they provide, in respect of the chamber 24, an outlet restriction which assists in settling the turbulence in the portion 35. Also, since the holes extend in the intended direction of flow they assist in making the flow parallel and uniform. The flows from the individual holes 47 have the opportunity of uniting in the chamber 48 before issuing through the opening 26. The area of the holes 47 should be as large as possible to minimize turbulence in the chamber 48 and, in any case, the hole area should not be less than the area of the inlet opening 25. Different film velocities are obtainable by changing the convergence of the edge portion 45.

In many cases, because of the random nature of the hot flow, it is difficult to determine the mean velocity of that part of the hot flow which influences the cooling film and the optimum film velocity is obtained experimentally by adjusting the outlet opening 26. If the distance between the walls 41, 42 reduced at the position of the edge portion 45 then the velocity of the film increases and vice versa. However, the flow area of the outlet opening must not be so reduced that it becomes less than the flow area of the inlet opening because then the film velocity would rise to a value exceeding that of the inlet velocity.

The annulus 41 is machined from an annular blank and is welded into position between the sections 40 as shown at 49. During the machining process the holes 47 are drilled through the web 46 before the edge portions 44, 45 are formed by rotary swaging. This method of construction makes possible good rigidity in the juncture between the sections 40 and makes it possible to produce the flow passage 30 with a desirable degree of accuracy.

It will be seen that the plane of the inlet opening is normal to the flow 17 and flow may be induced through the system without a positive difference in static pressure provided that the total pressure of the cold flow is greater than that of the hot flow.

Comparative tests have been made on a rig under controlled flow conditions. As an example of the improvement achieved it can be shown that, at a given flow condition, the cooling efficiency obtained with several types of passage systems in current use decreases from near 100% at the outlet opening 26 to 40-60% at a position 4 inches downstream thereof. A passage system designed on the principle of the present invention, and tested at the same flow condition, has given over 80% cooling efficiency 4 inches downstream of the outlet opening. The cooling efficiency is given by the expression $$(Th-Tw)/(Th-Tc)$$

where:

$Th$=temperature of the hot flow.

$Tc$=temperature of the cold flow.

$Tw$=temperature of the wall 16 at any given distance downstream of the outlet opening 26.

What we claim is:

1. In a gas turbine engine a combustion chamber comprising:
   (a) a cylindrical wall for separating a hot fluid flow along the interior of the chamber from an air flow of lower temperature and higher pressure along the exterior of the chamber;
   (b) the wall including an upstream section and a downstream section;
   (c) the odwnstream section being dimensioned for an upstream end portion thereof to overlap a downstream end portion of the upstream section and said overlapping portions defining between them a flow passage between the exterior and the interior of the wall;
   (d) the upstream extremity of the downstream section and the exterior of the upstream section forming between them at least one inlet opening leading to the flow passage and lying in a plane at least partially facing the direction of said air flow;
   (e) the downstream extremity of the upstream section and the interior of the downstream section forming between them an annular outlet opening positioned to direct flow from the passage to form a film between the interior of the downstream section and the hot flow adjacent thereto;
   (f) the outlet opening being dimensioned to have an effective flow area not less than that of the inlet opening;
   (g) the flow passage being dimensioned to define downstream of said inlet opening a sudden enlargement of the flow area to create turbulence in the flow and thereby to reduce the mean velocity of the flow without a significant rise in static pressure; and
   (h) the flow passage being further dimensioned to include between said sudden enlargement and said outlet opening a portion of substantially uniform flow area to assist in settling said turbulence and in forming a uniform flow.

2. A combustion chamber according to claim 1 comprising a web integrally joining said overlapping portions at a position intermediate between said openings, the web including holes for the passage of air therethrough, and wherein each of the overlapping portions is connected to the remainder of its section by a welded joint.

3. A combustion chamber according to claim 2 wherein the inlet opening is annular and the edge portion adjacent said extremity is curved to define directly downstream of the extremity of said sudden enlargement of the flow area.

References Cited

UNITED STATES PATENTS

| | | | |
|---|---|---|---|
| 2,670,601 | 3/1954 | Williams et al. | 60—39.65 |
| 2,958,194 | 11/1960 | Bayley | 60—39.65 |
| 3,113,431 | 12/1963 | Janes et al. | 60—39.65 |

JULIUS E. WEST, *Primary Examiner.*